United States Patent
Stevens et al.

(10) Patent No.: US 6,272,922 B1
(45) Date of Patent: Aug. 14, 2001

(54) FLUID-GAUGING SYSTEMS

(75) Inventors: Martin Stevens; Gerald Peter White, both of Cheltenham (GB)

(73) Assignee: Smiths Group PLC, London (GB)

( * ) Notice: Subject to any disclaimer, the term of this patent is extended or adjusted under 35 U.S.C. 154(b) by 0 days.

(21) Appl. No.: 09/360,448

(22) Filed: Jul. 26, 1999

(30) Foreign Application Priority Data

Aug. 12, 1998 (GB) ................................................ 9817454

(51) Int. Cl.[7] ........................... G01F 23/00; H01L 41/04; H03H 9/00
(52) U.S. Cl. ...................... 73/290 V; 310/359; 333/187
(58) Field of Search ........................ 73/290 R, 290 V, 73/304 R; 361/206, 207; 310/359; 333/187, 193, 194

(56) References Cited

U.S. PATENT DOCUMENTS

| | | | |
|---|---|---|---|
| 2,830,274 | * | 4/1958 | Rosen et al. ...................... 333/187 |
| 4,213,337 | * | 7/1980 | Langdon ........................... 73/290 V |
| 4,839,590 | * | 6/1989 | Koski et al. ...................... 73/290 V |

* cited by examiner

*Primary Examiner*—Daniel S. Larkin
*Assistant Examiner*—Katina Wilson
(74) *Attorney, Agent, or Firm*—Connolly Bove Lodge & Hutz

(57) ABSTRACT

A fuel-gauging system has an ultrasonic probe mounted in a tank, the probe being connected to a processor unit via an electrical signal path comprising two lengths of electrical wires and a piezoelectric transformer connected in series between the two lengths of wires. The transformer has two piezoelectric elements mounted on opposite sides of the wall of the tank so there is no direct electrical passage into the tank. The piezoelectric elements are matched to the resonant frequency of the probe so that signals of different frequencies are heavily attenuated.

12 Claims, 2 Drawing Sheets

FLUID-GAUGING SYSTEMS

BACKGROUND OF THE INVENTION

This invention relates to fluid-gauging systems.

There are various techniques by which the quantity of fluid in a tank can be measured involving a fluid-gauging probe located within the tank. The wires used to make electrical connection with the probe provide a path into the tank for electrical energy, such as caused by lightning strikes, electrical interference, or by faults in the drive/sensing circuit. Where the fluid in the tank is flammable, this can increase the risk of explosion within the tank.

BRIEF SUMMARY OF THE INVENTION

It is an object of the present invention to provide an improved fluid-gauging system.

According to the present invention there is provided a fluid-gauging system including an electrical fluid-gauging device located within a fluid tank and an electrical supply path for supplying signals to and from the device, the system including a piezoelectric transformer located in the electrical supply path operable to attenuate electrical signals passing to the device outside a range of frequencies.

The fluid-gauging device is preferably an acoustic fluid-gauging device. The fluid-gauging device preferably includes a piezoelectric transducer having frequency characteristics closely matched to those of the transformer. A resistor may be connected across electrodes of the piezoelectric transformer to dissipate electrical signals produced by mechanical shock applied to the transformer. The piezoelectric transformer is preferably mounted at the wall of the tank and cooperating piezoelectric elements of the transformer may be located on opposite sides of the wall of the tank. Alternatively, the transformer may be mounted on the outside of the wall of the tank and the transformer connected with the fluid-gauging device by an electrical wire extending through the wall of the tank. The transformer may include a single block of piezoelectric material on which both the input and output electrodes are mounted.

An aircraft fuel-gauging system according to the present invention, will now be described, by way of example, with reference to the accompanying drawings.

DETAILED DESCRIPTION OF THE PREFERRED EMBODIMENTS

Figure 1:
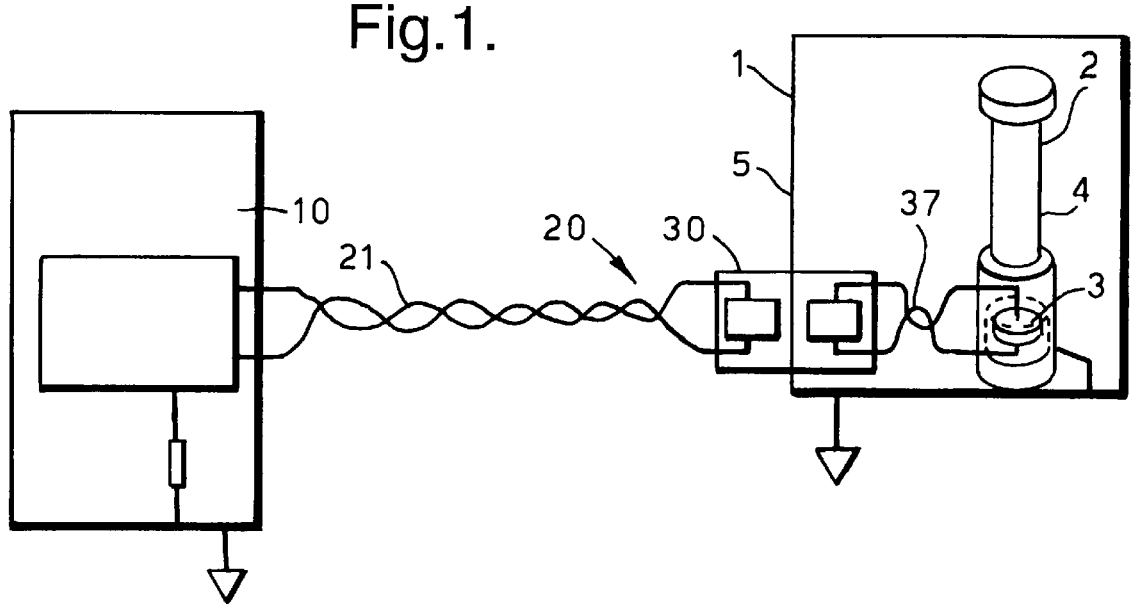
FIG. 1 is a schematic view of the system.

With reference first to FIG. 1, the fuel-gauging system includes a tank 1, which might be located in the wings or body of the aircraft, containing a conventional fuel-gauging device in the form of an acoustic, ultrasonic probe 2, such as of the kind described in GB2311373, GB2290141, GB2270160, GB2265005 or GB2265219. The probe 2 is mounted vertically at the lower end of the tank 1 and includes a piezoelectric, ultrasonic transducer 3 mounted at the lower end of a hollow housing 4, which fills to the same level as fuel in the tank. The wall 5 of the tank 1 and the housing 4 of the probe 2 are both connected to the aircraft electrical ground.

The system also includes a processor unit 10 mounted remotely of the tank 1. The processor unit 10 supplies drive signals to the probe 2 and receives output signals from the probe from which it calculates, in a known manner, the level of fuel in the tank 1 and hence its quantity. A typical system would have several probes in each tank.

Signals are supplied to and from the probe 2 via an electrical signal path 20. The signal path 20 comprises a tightly twisted pair of wires 21, which may be screened, extending from the processor unit 10. The wires 21 extend to a piezoelectric transformer 30 forming a part of the signal path 20. The transformer 30 is shown in more detail in FIG. 2. The transformer 30 is an isolating transformer mounted on the wall 5 of the tank 1 and comprises two separate piezoelectric elements 31 and 32 bonded to opposite sides of the wall. The wires 21 from the processor unit 10 make electrical connection to two electrodes 33 and 34 on opposite faces of the external element 31. The internal element 32 also has two electrodes 35 and 36 to which are connected a pair of wires 37 extending to the transducer 3 in the probe 2. The frequency characteristics of the transformer elements 31 and 32 are closely matched to those of the transducer 3 in the probe 2 so that they have similar resonant frequencies.

In operation, the processor unit 10 supplies bursts of electrical energy in a narrow band of ultrasonic frequencies along the wires 21. These cause the external element 31 of the transformer 30 to vibrate mechanically at the same frequency, which vibration is coupled through the wall 5 to the internal element 32. The coupled vibration in the internal element 32 causes charges on its electrodes 35 and 36, thereby causing an electrical signal at the same frequency to flow along the wires 37 to the transducer 3. Similarly, output signals from the transducer 3 will be transformed by the transformer 30 from electrical to mechanical and back to electrical signals before passing to the processor unit 10 via the wires 21.

Any signals at frequencies outside a narrow band around the resonant frequency of the transformer 30 will be heavily attenuated so that dc signals, induced electrical interference in the wires 21, signals caused by lightning strike or the like will be heavily suppressed. The energy level at the frequency of operation of the transformer can also be limited by use of multiple transient voltage suppression TVS devices, if required, connected to the transformer 30. Alternatively, the maximum energy transferred by the transformer 30 can be limited by mechanically clamping the transformer, such as by potting in a suitable material or by restriction in an enclosure. Although mechanical shock applied to the transformer 30 could cause the piezoelectric elements 31 and 32 to produce electrical signals, these can be dissipated by means of respective resistors 38 and 39 connected between the electrodes of each element.

Instead of converting the output of the internal transformer element 32 into an electrical signal and supplying this along wires to the separate probe transducer 3, the internal element could itself form a part of a probe transducer.

Figure 2:
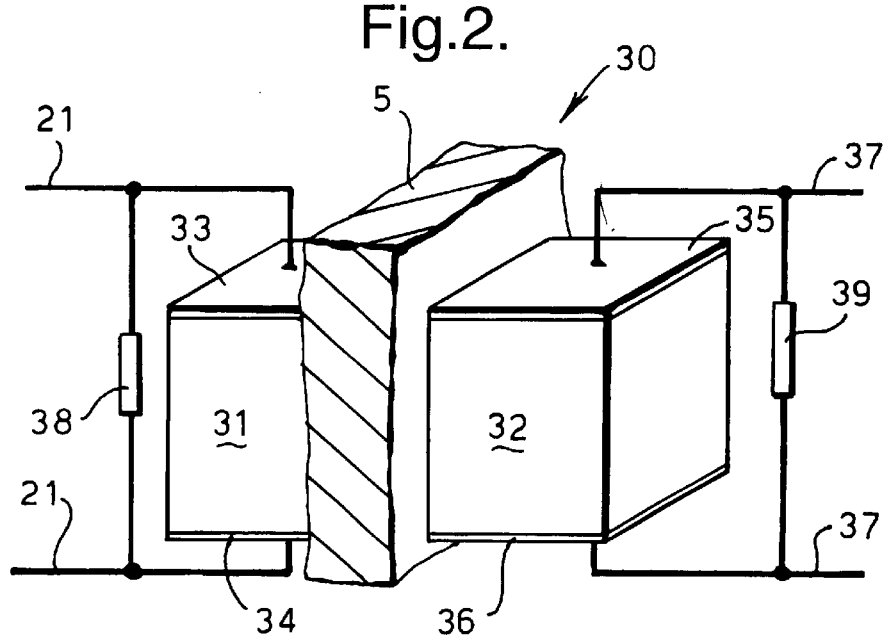
FIG. 2 is a perspective view illustrating the transformer.
Figure 3:
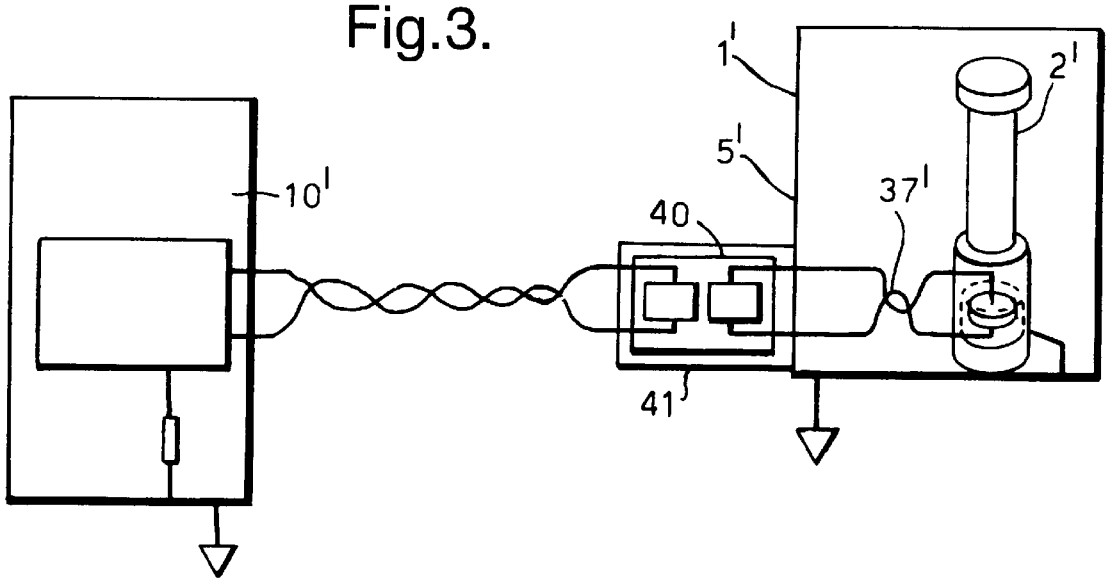
FIG. 3 is a schematic view of an alternative system.

In some applications, it may not be possible to mount elements of the transformer on opposite sides of the tank wall. In such cases, an arrangement of the kind shown in FIG. 3 may be used where items the same as those in the arrangement of FIG. 2 are given the same reference numerals with the addition of a prime '. The piezoelectric transformer 40 is mounted entirely outside the tank 1' in a housing 41 mounted at the tank wall 5'. The housing 41 is electrically screened and the wires 37' between the transformer 40 and the probe 2' extend through the wall 5' at a location where they are screened by the housing, so there is a reduced risk of electrical interference.

Figure 4:
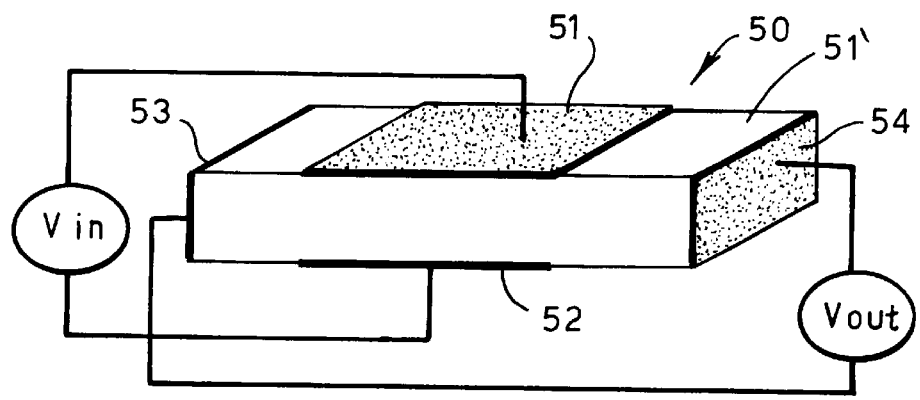
FIGS. 4 and 5 are perspective views illustrating alternative transformers.
Figure 5:
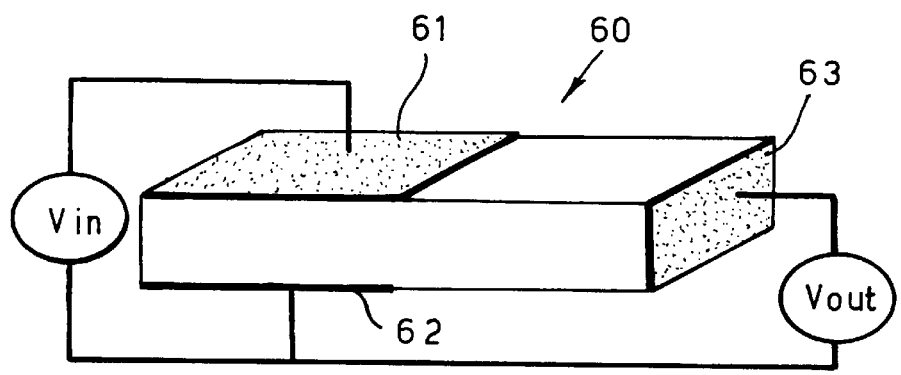

The transformer 40 may be of the same kind as that shown in FIG. 2, with two, separate, isolated piezoelectric elements. Alternatively, a transformer 50 of the kind shown in FIG. 4 could be used having a single block 51' of piezoelectric material with two pairs of electrodes 51 and 52, and 53 and 54 on different, opposite faces. FIG. 5 shows another alternative type of transformer 60, similar to that 50 in FIG. 3, with a pair 61 and 62 of electrodes at the input side but only having one output electrode 63, the other output signal being taken from one of the input electrodes 62. This transformer 60 does not produce complete electrical isolation between the input and output terminals.

The arrangement of the present invention is particularly suitable for use with ultrasonic fluid-gauging systems but is not limited to such applications. For example, it could be used with capacitive fluid-gauging systems if the piezoelectric transformer were selected to have a resonant frequency the same as the frequency of energization of a capacitive probe.

The present invention enables various advantages to be achieved. For example, it reduces or avoids the need to use discrete components such as transzorbs, diodes or the like, which have parasitic effects. The transformer is particularly suitable at rejecting dc faults and faults at 400 Hz, which is the alternating supply frequency commonly used in aircraft. The invention enables a completely acoustic, non-electrical interface to be made with the tank probe. The piezoelectric transformer can be smaller, lighter and more compact than conventional electromagnetic transformers and requires fewer additional components. Piezoelectric transformers also do not store energy as do electro-magnetic transformers. A further important advantage of piezoelectric transformers is that they can be arranged in such a way that they can be driven by existing circuits.

What we claim is:

1. A fluid-gauging system comprising: an electrical fluid-gauging device located within a fluid tank; an electrical supply path for supplying signals to and from said device; and a piezoelectric transformer located in said electrical supply path, said transformer being operable to attenuate electrical signals passing to said device outside a range of frequencies.

2. A fluid-gauging system according to claim 1, wherein said fluid-gauging device is an acoustic fluid-gauging device.

3. A fluid-gauging system according to claim 2, wherein said fluid-gauging device includes a piezoelectric transducer, and wherein the frequency characteristics of said transducer are closely matched to those of said transformer.

4. A fluid-gauging system according to claim 1, wherein said transformer has two electrodes, and wherein said system includes a resistor connected across said electrodes to dissipate electrical signals produced by mechanical shock applied to said transformer.

5. A fluid-gauging system according to claim 1, wherein said piezoelectric transformer is mounted at a wall of said tank.

6. A fluid-gauging system according to claim 5, wherein said transformer has two cooperating piezoelectric elements, and wherein said piezoelectric elements are located on opposite sides of said wall of said tank.

7. A fluid-gauging system according to claim 5, wherein said transformer is mounted on an outside of said wall of said tank, and wherein said transformer is connected with said fluid-gauging device by an electrical wire extending through said wall of said tank.

8. A fluid-gauging system according to claim 7, wherein said transformer includes a single block of piezoelectric material, and wherein both input and output electrodes of said transformer are mounted on said block.

9. A fluid-gauging system comprising: an electrical fluid-gauging device located within a fluid tank; and an electrical supply path for supplying signals to and from said device, said electrical supply path including a first length of wire, a piezoelectric transformer having an input connected with said first length of wire, and a second length of wire connecting an output of said transformer with said fluid-gauging device, wherein said transformer includes two piezoelectric elements mounted on opposite sides of a wall of said tank, wherein the resonant frequency of said piezoelectric elements is similar to a frequency of operation of said fluid-gauging device, and wherein signals at other frequencies are heavily attenuated by said transformer.

10. A fluid-gauging system according to claim 9, wherein said fluid-gauging device is an ultrasonic device.

11. A fluid-gauging system comprising: an electrical fluid-gauging device located within a fluid tank; and an electrical supply path for supplying signals to and from said device, said electrical supply path including a first length of wire, a piezoelectric transformer having an input connected with said first length of wire, and a second length of wire connecting an output of said transformer with said fluid-gauging device, wherein said transformer is mounted on an outside of a wall of said tank in a screening housing, wherein said second length of wires extends through said wall of said tank at a location where they are screened by said housing, wherein the resonant frequency of said transformer is similar to a frequency of operation of said fluid-gauging device, and wherein signals at other frequencies are heavily attenuated by said transformer.

12. A fluid-gauging system according to claim 11, wherein said fluid-gauging device is an ultrasonic device.

* * * * *